(12) United States Patent
Garcia (10) Patent No.: US 11,488,379 B2
(45) Date of Patent: Nov. 1, 2022

(54) APPARATUS AND METHOD FOR AUTOMATIC FAILURE THRESHOLD DETECTION FOR IMAGES

(71) Applicant: Harman International Industries, Incorporated, Stamford, CT (US)

(72) Inventor: Juan Garcia, Hoffman Estates, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 136 days.

(21) Appl. No.: 16/980,372

(22) PCT Filed: Mar. 13, 2018

(86) PCT No.: PCT/US2018/022234
§ 371 (c)(1),
(2) Date: Sep. 11, 2020

(87) PCT Pub. No.: WO2019/177596
PCT Pub. Date: Sep. 19, 2019

(65) Prior Publication Data
US 2021/0042551 A1     Feb. 11, 2021

(51) Int. Cl.
*G06K 9/00* (2022.01)
*G06V 10/98* (2022.01)
(Continued)

(52) U.S. Cl.
CPC ............ *G06V 10/993* (2022.01); *G06V 10/22* (2022.01); *G06V 10/46* (2022.01); *G06V 20/56* (2022.01); *G06V 10/473* (2022.01); *G06V 20/582* (2022.01)

(58) Field of Classification Search
None
See application file for complete search history.

(56) References Cited

U.S. PATENT DOCUMENTS 6,853,738 B1   2/2005 Nishigaki et al.
10,977,347 B2 * 4/2021 Eltoft .................... G06V 40/67
(Continued)

OTHER PUBLICATIONS

Warsop et al. "Distance-invariant sign detection in high-definition video," 2010 IEEE 9th International Conference on Cyberntic Intelligent Systems, 2010, pp. 1-6, doi: 10.1109/UKRICIS.2010.5898097. (Year: 2010).*
(Continued)

*Primary Examiner* — Feng Niu
(74) *Attorney, Agent, or Firm* — Brooks Kushman P.C.

(57) ABSTRACT

In at least one embodiment, a computer-program product embodied in a non-transitory computer readable medium that is programmed to detect a performance threshold for one or more cameras is provided. The computer-program product includes instructions to capture a plurality of images from one or more cameras to compare an object within each captured image to a predetermined object to determine whether the object has been correctly identified and instructions to extract the object from each captured image. The computer-program product includes instructions to apply at least one gradient to each extracted object to generate a plurality of gradient images. The computer-program product includes instructions to compare the extracted object to the predetermined object and to determine whether the extracted object that is modified by the at least one gradient has been correctly identified. The computer-program product includes instructions to establish a performance threshold for the one or more cameras.

18 Claims, 7 Drawing Sheets

(51) Int. Cl.
*G06V 10/22* (2022.01)
*G06V 10/46* (2022.01)
*G06V 20/56* (2022.01)
*G06V 20/58* (2022.01)

(56) References Cited

U.S. PATENT DOCUMENTS

2003/0086608 A1    5/2003   Frost et al.
2007/0019073 A1    1/2007   Comaniciu et al.
2016/0055645 A1*   2/2016   Ito ........................ G06V 20/52
                                                                  382/103

OTHER PUBLICATIONS

International Search Report dated Jun. 11, 2018, PCT/US2018/022234 filed Mar. 13, 2018, 11 pgs.

* cited by examiner

APPARATUS AND METHOD FOR AUTOMATIC FAILURE THRESHOLD DETECTION FOR IMAGES

CROSS-REFERENCE TO RELATED APPLICATION

This application is the U.S. national phase of PCT Application No. PCT/US18/022234 filed on Mar. 13, 2018, the disclosure of which is incorporated in its entirety by reference herein.

TECHNICAL FIELD

Aspects disclosed herein generally relate to an apparatus and method for providing an automatic failure threshold detection for images. These aspects and others will be discussed in more detail herein.

BACKGROUND

It is generally necessary for vehicles to recognize images external to the vehicle for a number of functions performed by the vehicle. Deep learning/neural network techniques can be trained to recognize the images captured by camera(s) on the vehicle. However, it may be difficult to determine a threshold point where such deep learning/neural network techniques or other algorithms fail. For example, a hammer can be tested to determine its tensile strength by increasing the shearing force incrementally to find out where the hammer fails. However, there is no in-market equivalent to detect performance thresholds for camera systems that use deep learning techniques to detect objects.

Today, test engineers may use camera footage from road tests to detect objects. This requires an enormous amount of video in specific situations to find edge cases. In many cases, road tests conducted over millions of miles are required to capture as many scenarios as possible. In some cases, road tests may be conducted over billions or trillions of miles to capture every possible road condition. Often, many thousands of edge case situations (or training data) is required for deep learning techniques to learn what the right outcome is (i.e., learn what the correct image is).

SUMMARY

In at least one embodiment, a computer-program product embodied in a non-transitory computer readable medium that is programmed to detect a performance threshold for one or more cameras is provided. The computer-program product includes instructions to capture a plurality of images from one or more cameras to compare an object within each captured image to a predetermined object to determine whether the object has been correctly identified and instructions to extract the object from each captured image that is determined to be correctly identified. The computer-program product includes instructions to apply at least one gradient to each extracted object to generate a plurality of gradient images. Each gradient image includes the extracted object that is modified by the at least one gradient. The computer-program product includes instructions to compare the extracted object that is modified by the at least one gradient to the predetermined object and to determine whether the extracted object that is modified by the at least one gradient has been correctly identified based on the comparison of the extracted object that is modified by the at least one gradient to the predetermined object. The computer-program product includes instructions to establish a performance threshold for the one or more cameras after determining whether the extracted object that is modified by the at least one gradient has been correctly identified.

In at least another embodiment, an apparatus to detect a performance threshold for one or more cameras is provided. The apparatus includes a memory device and an image detector. The image detector includes the memory device and is configured to capture a plurality of images from one or more cameras and to compare an object within each captured image to a predetermined object that is stored on the memory device to determine whether the object has been correctly identified. The image detector is further configured to extract the object from each captured image that is determined to be correctly identified and to apply at least one gradient to each extracted object to generate a plurality of gradient images, wherein each gradient image includes the extracted object that is modified by the at least one gradient. The image detector is further configured to compare the extracted object that is modified by the at least one gradient to the predetermined object and to determine whether the extracted object that is modified by the at least one gradient has been correctly identified based on the comparison of the extracted object that is modified by the at least one gradient to the predetermined object. The image detector is further configured to establish a performance threshold for the one or more cameras after determining whether the extracted object that is modified by the at least one gradient has been correctly identified.

In at least another embodiment, an apparatus to detect a performance threshold for one or more cameras is provided. The apparatus includes a memory device and an image detector. The image detector includes the memory device and is configured to capture a plurality of images from one or more cameras and to compare an object within each captured image to a predetermined object that is stored on the memory device to determine whether the object has been correctly identified. The image detector is further configured to extract the object from each captured image that is determined to be correctly identified and to apply at least one gradient to each extracted object to generate a plurality of gradient images, wherein each gradient image includes the extracted object that is modified by the at least one gradient. The image detector is further configured to compare the extracted object that is modified by the at least one gradient to the predetermined object and to determine whether the extracted object that is modified by the at least one gradient has been correctly identified based on the comparison of the extracted object that is modified by the at least one gradient to the predetermined object. The image detector is further configured to establish a performance threshold for the one or more cameras after determining whether the extracted object that is modified by the at least one gradient has been correctly identified.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium programmed to perform any number of the functions as disclosed.

Aspects disclosed herein generally provide for an apparatus and method that provides a failure threshold for any given object detection algorithm (or computer based technique when executed on electrically based devices or electronics) to determine a failure rate or range for any number of cameras on a vehicle. For example, the apparatus may use a target object detector to evaluate a given set of images captured from at least one camera on a vehicle. The apparatus may filter correctly identified captured images and separate the correctly identified captured images from images that are not correctly identified. A correctly identified image may correspond to, for example, a stop sign (e.g., any street or road sign for that matter) that was correctly identified to be a stop sign by the apparatus. An incorrectly identified image may correspond to, for example, a sign that perhaps was initially identified as a yield sign but in reality, is a stop sign. The apparatus may generate a bounding box around an object for each correctly identified image and extract the contents of the object surrounded by the bounding box. The apparatus may then apply any number of special effects or gradients (e.g., saturation, distortion, contrast, blurriness, sharpness, brightness, etc.) at different levels (e.g., 0 to 100) to the correctly identified images to generate a plurality of gradient images. The apparatus may composite the plurality of gradient images back to the original set of correctly identified images. The apparatus re-evaluates the plurality of gradient images against the originally captured images and then determines a pass rate or a failure rate to establish a threshold range (or performance threshold) in which the camera may fail (or alternatively where the camera provides adequate performance). For example, the apparatus may determine that a particular camera may successfully recognize objects within an image for a certain performance gradient (or gradient of interest) such as a contrast level from 56 to 87 (e.g., from a range of 0-100). Thus, in this case, the apparatus may determine that any image captured by the camera may successfully detect an image of an object external to the vehicle when the image has a contrast level of 56 to 87. Therefore, any system level engineer can associate a corresponding contrast level (or any other performance gradient) for a particular camera and essentially understand the camera's performance characteristics.

Figure 1:
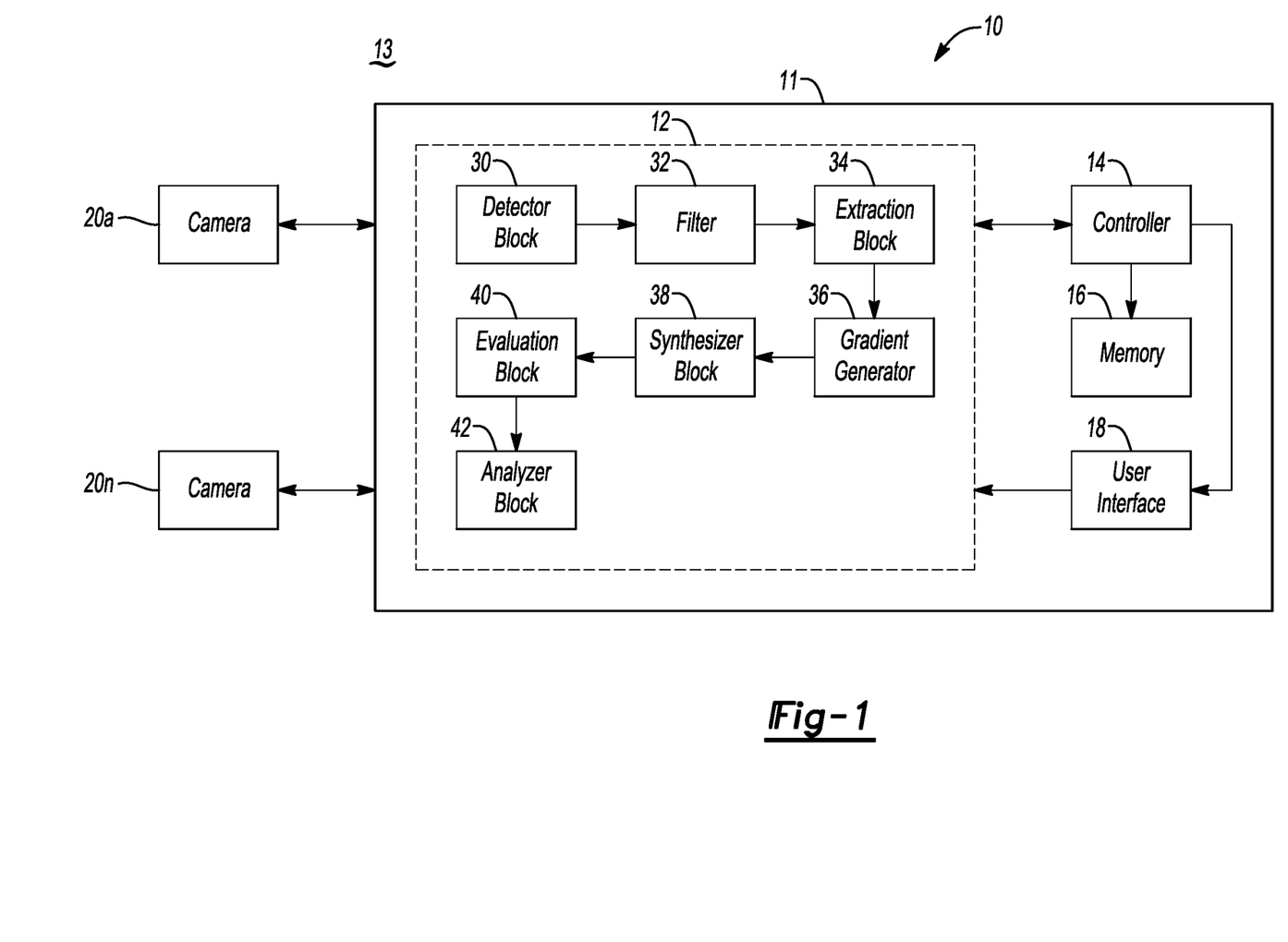
FIG. 1 depicts an apparatus for automatic failure threshold detection for one or more cameras in accordance to one embodiment.

FIG. 1 depicts an apparatus 10 for automatic failure threshold detection for one or more cameras 20a-20n ("20") in accordance to one embodiment. The apparatus 10 generally includes an image detector 11 and may be positioned in a vehicle 13. The image detector 11 includes an object detection block 12, a controller 14, memory 16, and a user interface 18. The object detection block 12 is electrically coupled to the controller 14. The one or more cameras 20 (hereafter "camera 20" or "cameras 20") may be electrically coupled to the image detector 11. The camera 20 is generally configured to capture images external to the vehicle 13 and to transmit the same to the image detector 11. While not shown, it is recognized that the image detector 11 may be implemented in any of the cameras 20. Alternatively, the image detector 11 may be positioned in any hardware based electronic control unit positioned in the vehicle 13. In addition, the image detector 11 may be distributed on any number of integrated circuits. The image detector 11 may be positioned external to the vehicle (i.e., on a server) and engage in wireless communication with the vehicle 13 via a cloud based implementation. It is also recognized that one or more elements of the object detector block 12 may be positioned exterior to the vehicle 13 such as on a server that is remote from the vehicle 13 and engage in wireless communication with the vehicle 13 via a cloud based implementation. Similarly, it is also recognized that the controller 14 and/or the memory 16 may be positioned exterior to the vehicle such as on the server that is remote from the vehicle 13 and engage in wireless communication with the vehicle 13 via a cloud based implementation.

The image detector 11 is generally configured to determine various thresholds for any of the cameras 20. For example, the image detector 11 may determine that the camera 20 has the capability of successfully identifying an image of an object within a specific gradient range (or performance gradient). It is recognized that the gradient may correspond to any one or more of saturation, distortion, contrast, blurriness, sharpness, etc. For example, the specified gradient range may correspond to a saturation level of anywhere from 0 to 100, a distortion level of anywhere from 0 to 100, a contrast level of anywhere from 0 to 100, a blurriness level of anywhere from 0 to 100, a sharpness level of anywhere from 0 to 100, etc. In particular, the image detector 11 may determine, for example, that the camera 20 may successfully identify an object external to the vehicle 13 with a contrast level from 36 to 67 and for any other performance gradient that is of interest such as, for example, saturation, distortion, contrast, blurriness, sharpness, brightness, etc. A camera system designer may utilize such information to understand the performance characteristics of each camera 20 on the vehicle 13.

The image detector 11 includes a detector block 30, a filter 32, an extraction block 34, a gradient generator 36, a synthesizer block 38, an evaluation block 40, and an analyzer block 42. A particular camera 20 provides captured images to the detector block 30. The detector block 30 executes an object detection algorithm to detect a corresponding object captured in a predetermined number of images by the camera 20. For example, the detector block 30 may determine that the corresponding object in the captured images is, but not limited to, a road sign such as a stop sign, speed limit sign, yield sign, etc. The detector block 30 may also determine whether the object detected in the corresponding image has been correctly identified or incorrectly identified by comparing the object to a predetermined object.

Figure 2:
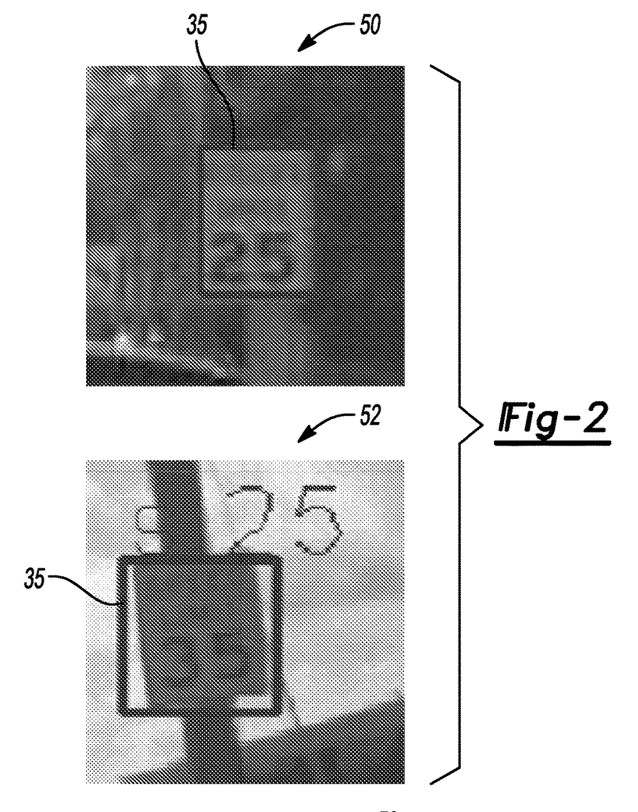
FIG. 2 depicts a set of images detected by the apparatus in accordance to one embodiment.

Assume for example that the camera 20 has provided 100 captured images with an object of a speed limit sign with some numeric value that corresponds to the speed limit to the detector block 30. Further assume that the actual speed limit on the speed limit sign is 25 mph. The captured images may correctly identify the speed limit of 25 mph or alternatively incorrectly identify a different speed limit. The detector block 30 executes the object detection algorithm and assigns a score for each corresponding object in the captured image. The score generally corresponds to whether the object (e.g., the speed limit sign) detected in each of the 100 captured images has been correctly identified or incorrectly identified by the detector block 30. The detector block 30 may assign a value of "1" for each image in which the speed limit sign of 25 mph has been correctly identified out of the 100 captured images. The detector block 30 may assign a value of "0" for each image in which the speed limit sign of 25 mph (i.e., perhaps the speed limit sign is 35 mph) has been incorrectly identified out of the 100 captured images. The detector block 30 determines whether the detected object (e.g., the speed limit sign) in the corresponding images (or images under test (IUT) have been correctly or incorrectly identified by comparing the object in the image to a previously stored object (or the predetermined object) (e.g., the previously stored object may correspond to a speed limit sign or other object established with a ground truth image set as established by another apparatus or human) of the objects and then determining, based on the comparison, whether the object in the image is similar to the previously stored object. FIG. 2 generally illustrates a correctly identified image 50 and an incorrectly identified image 52. The apparatus 10 provides a bounding box 35 around each image prior to determining whether the object is either correctly identified or incorrectly identified. As shown in FIG. 2, the correctly identified image 50 illustrates a speed limit sign of 25 mph and the incorrectly identified image 52 illustrates a speed limit sign of 35 mph. For purposes of illustration, it should be recognized that the actual speed limit sign corresponds to 25 mph and for some reason, the detector block 30 determines that the speed limit sign corresponds to 35 mph due to distortion or other issue related to the particular camera 20.

Referring back to FIG. 1, the filter 32 separates the correctly identified images (e.g., the images with a value of "1" for the detected object) from the incorrectly identified images (e.g., the images with a value of "0" for the detected object). Again, referring to the example above in which 100 images were captured, assume, for example, that the detector block 30 determines that 50 images had the object that was correctly identified and that 50 images had the object that was incorrectly identified. In this case, the filter 32 separates the 50 correctly identified images from the 50 incorrectly identified images.

Figure 3:
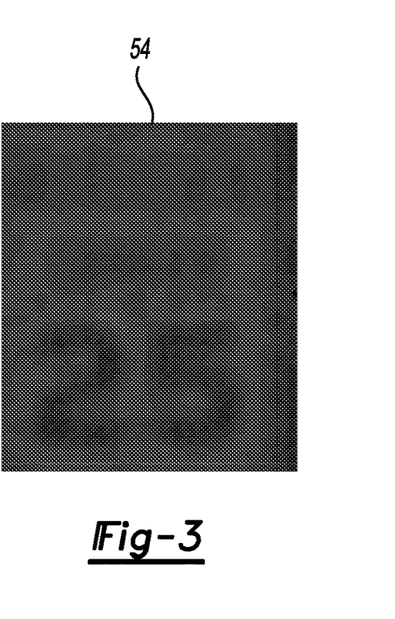
FIG. 3 depicts an extracted image in accordance to one embodiment.

The extraction block 34 evaluates the object for each object in the bounding box 35 that is correctly identified. In the example above, there are 50 bounding boxes 35 for the 50 correctly identified images. Alternatively, the extraction block 34 may place 4 coordinate points around each correctly identified image. The extraction block 34 then extracts the object within the bounding box 35. FIG. 3 generally illustrates an extracted image 54 corresponding to the extracted object by the extraction block 34.

Figure 4:
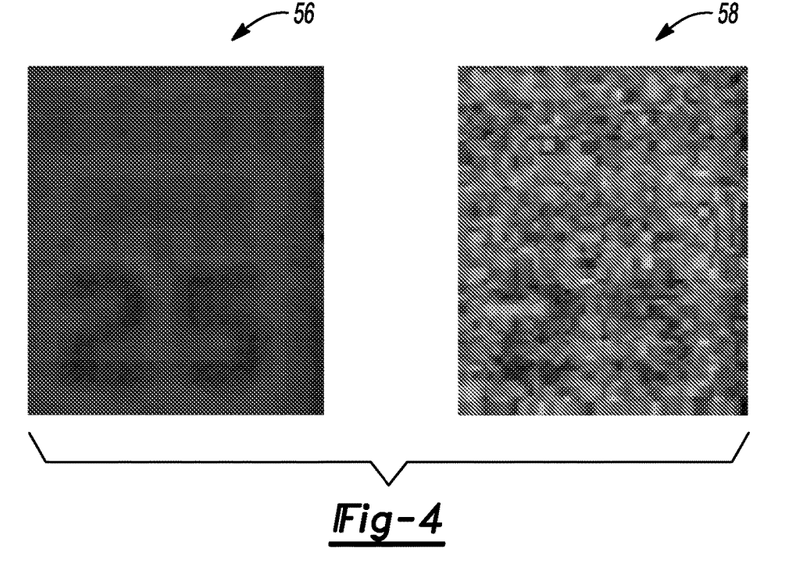
FIG. 4 depicts a plurality of gradient images having a corresponding gradient level in accordance to one embodiment.

Referring back to FIG. 1, the gradient generator 36 applies any number of special effects or gradients (e.g., saturation, distortion, contrast, blurriness, sharpness, etc.) at different levels (e.g., 0 to 100) to the extracted object of the correctly identified images to generate a plurality of gradient images. In this case, consider the example in which it is desirable to understand a corresponding contrast level for a particular camera 20. Specifically, it may be desirable to determine the corresponding contrast level in which a particular camera 20 successfully (or unsuccessfully) identifies an object in an image. A user may select via the user interface 28 for the image detector 11 to determine the corresponding contrast level for a particular camera 20. In this case, the controller 14 controls the gradient generator 36 to apply a contrast level from 0 to 100 to each correctly identified image that is output from the extraction block 34. Consider again for example that the extraction block 34 generates 50 bounding boxes 35 for the 50 correctly identified images. In this case, the gradient generator 36 applies 100 different levels of contrast for each of the 50 bounding boxes. Thus, the gradient generator 36 generates 5000 gradient images (e.g., 100 contrast levels*50 correctly identified bounding box images provided by the extraction block 34). It is recognized that the user may control the image detector 11 via the user interface 18 to apply any one or more gradients at the different levels to determine a gradient of interest (or the performance gradient) for a particular camera 20. FIG. 4 depicts an example of one correctly identified image 56 at a corresponding contrast level. FIG. 4 also depicts an example one correctly identified image 58 at a corresponding distortion level.

Figure 5:
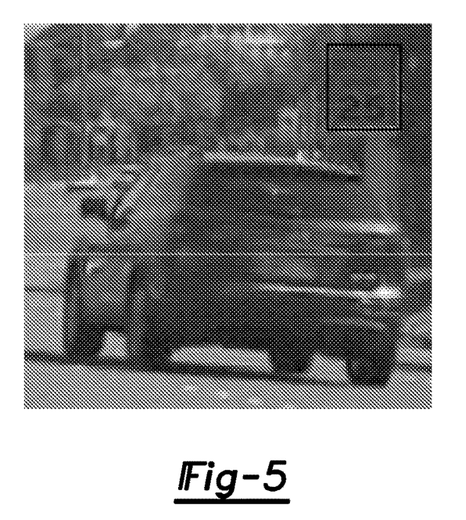
FIG. 5 generally depicts a composite image generated by the apparatus in accordance to one embodiment.
Figure 6:
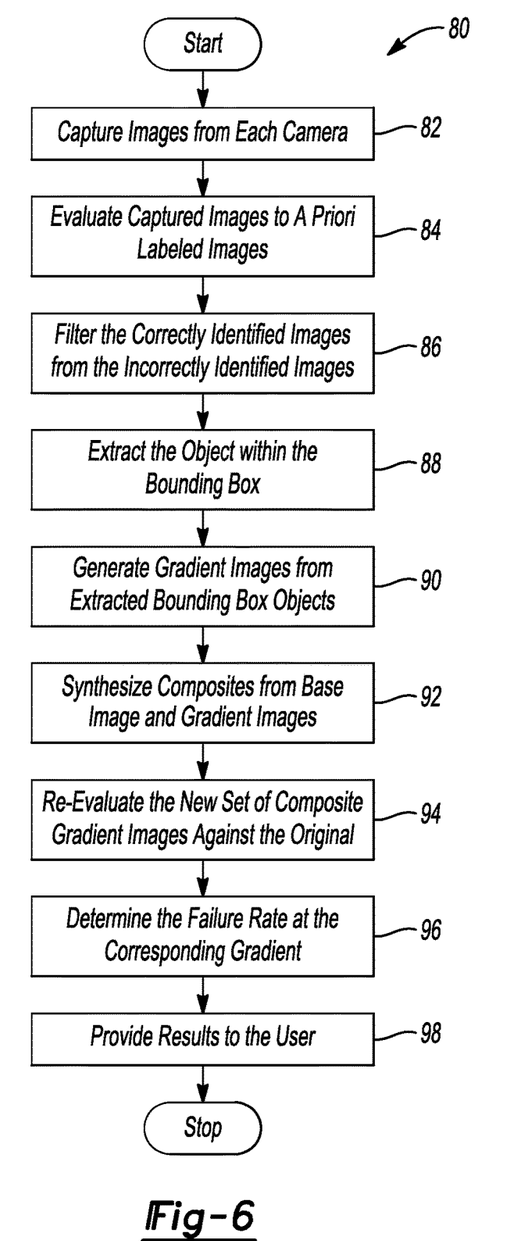
FIG. 6 depicts a method for performing an automatic failure threshold detection for the one or more cameras in accordance to one embodiment.

The synthesizer block 38 composites the plurality of gradient images back to the original set of correctly identified images. For the example noted above, the synthesizer block 38 composites the 5000 gradient images back to the original set of correctly identified images that were generated by the filter 32. In this case, the synthesizer block 38 composites each gradient image to a predetermined size (e.g., 1"×1"). In other words, the synthesizer block 38 inserts a new image parameter progression image into the originally captured image at the coordinates established by the bounding box and flattens every image layer to provide a composite image. The apparatus 10 may perform a resizing operation based on the original "base" image. Each base image may have its own bounding box coordinates and the extracted bounding box images can be different proportions (W×H). Prior to compositing, these different proportions have to be resized to fit the bounding box dimensions (or coordinates). FIG. 5 depicts the image being inserted within the coordinates of the bounding box (note that the bounding box is not actually present) and flattens this image layer to provide a composite image. The synthesizer block 38 inserts a new image parameter progression image (e.g., a speed limit sign) into the originally captured image by the camera 20. This is performed for each of the generated gradient images generated by the gradient generator 36. In the noted example above, the synthesizer block 38 inserts each of such new bounding boxes 60 into the originally captured image to provide a composite image. Each of the plurality of gradient images (i.e., gradient level from 0 to 100) is placed as an overlay layer on top of the original base image in the bounding box coordinates (e.g., gradient value 0+base image=composite image 0, gradient value 1+base image=composite image 1, . . . all the way up to gradient value 100+base image). The synthesizer block 38 then flattens each image to create a base image with a single gradient object.

The evaluation block 40 compares the object (e.g., with the applied gradient level) in in each composite image to the previously stored information corresponding to the object (or to the predetermined object that may correspond to a speed limit sign or other object established with a ground truth image set as established by another apparatus or human)) to determine whether the contents of the gradient image can be correctly identified (e.g., determines whether the speed limit sign with a corresponding gradient can be correctly identified). Similarly, as described above in connection with the detector block 30, the evaluation block 40 executes the object detection algorithm and assigns a score for each corresponding object in the captured image. The score generally corresponds to whether the object (e.g., the speed limit sign) in the composite image has been correctly identified or incorrectly identified by the detector block 40. For example, the evaluation block 40 may assign a value of "1" for each image in which the speed limit sign of 25 mph has been correctly identified out of the 5000 composite images. The evaluation block 40 may assign a value of "0" for each image in which the speed limit sign of 25 mph (i.e., perhaps the speed limit sign is 35 mph) has been incorrectly identified out of the 5000 composite images. The evaluation block 40 records the particular gradient levels (e.g., saturation, distortion, contrast, blurriness, sharpness, etc.) as applied by the gradient generator 36 for the images that have been correctly identified and for the images that have not been correctly identified.

The evaluation block 40 determines whether the contents of each gradient image (e.g., the speed limit sign) in a corresponding new bounding box 60 have been correctly or incorrectly identified by comparing the contents of each gradient image to previously stored representatives (e.g., previously stored images of a speed limit sign) of the objects and then determining, based on the comparison, whether the contents of the gradient image is similar to the previously stored object.

The analyzer block 42 determines a failure rate for the corresponding camera 20 by determining which of particular gradient images have been incorrectly identified by the evaluation block 40. The analyzer block 42 receives information corresponding to the particular gradient levels that correspond to an incorrectly identified gradient image and provides the failure rate. Consider for example that the gradient of interest was a contrast level for a particular camera 20 and that the analyzer block 42 determines that the failure rate for the camera was at a contrast level of 56 or less (from a level of 0-100) and at a contrast level of 87 or higher. The analyzer block 42 may then determine that any images captured by the camera 20 having a contrast level of 56 or less and 87 or higher, will not be correctly identified by the camera 20. For example, if there were 10 base images (and 1000 composite images) and the gradient of interest was contrast, then there would be 10 minimum gradient pass levels (GPL min) and 10 maximum gradient levels (GPL max). The 10 GPL min values were 10, 10, 15, 15, 20, 20, 25, 30, and 30. The camera contrast GPL min could be interpreted as 20 with a standard deviation of 6.7

The analyzer block 42 may also determine that any images with a contrast level between 57 and 86 may be correctly identifying for the camera 20 of interest. The analyzer block 42 may then provide the failure rate information and/or success rate information for the contrast level to the user interface 18 to provide such information to a user. Therefore, any system level engineer can associate a corresponding contrast level for a particular camera and essentially understand the camera's performance characteristics (i.e., failure or success rate in correctly identifying an image at a particular gradient of interest).

FIG. 2 depicts a method 80 performing an automatic failure threshold detection for the one or more cameras 20 in accordance to one embodiment.

In operation 82, the image detector 11 receives any number of captured images from each camera 20 positioned on the vehicle 13.

Figure 7:
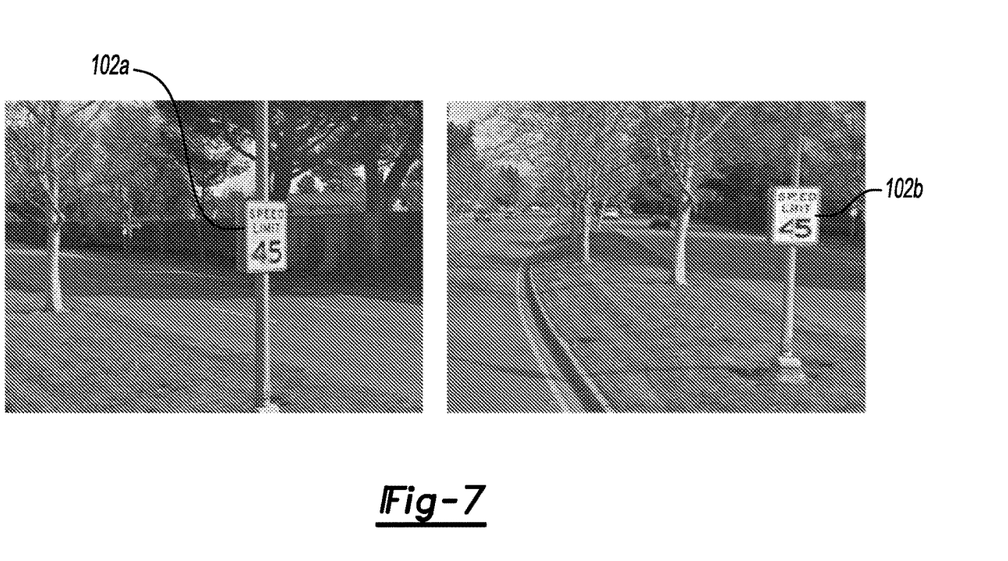
FIG. 7 depicts correctly identified images from captured images in accordance to one embodiment.

In operation 84, the detector block 30 executes an object based algorithm to detect a corresponding object that is positioned within a predetermined number of the captured images (e.g., a speed limit as present in a view external to the vehicle 13). The detector block 30 identifies an object within the captured images and executes an object detection algorithm to determine whether the identified object in the captured images has been correctly identified. The detector block 30 determines whether the detected object (e.g., the speed limit sign) in the corresponding images have been correctly or incorrectly identified by comparing the object to previously stored representatives (e.g., previously stored images of a speed limit sign) of the objects and then determining, based on the comparison, whether the object in the image is similar to the previously stored object. The detector block 30 assigns a value of "1" for each image in which the object in the image was correctly identified and assigns a value of "0" for each image in which the object in the image was incorrectly identified. FIG. 7 illustrates two separate images 102a and 102b that have been captured by the camera 20 and which each include an object (i.e., in this case the speed limit of 45 mph) which has been correctly identified.

Figure 8:
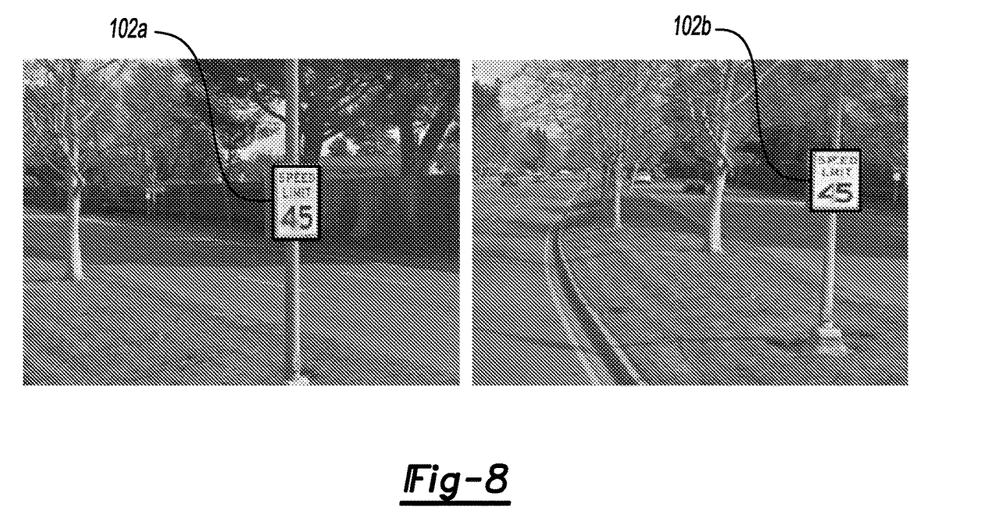
FIG. 8 depicts a plurality of filtered captured images in accordance to one embodiment.

In operation 86, the filter 32 separates the correctly identified images (e.g., the images with a value of "1" for the detected object) from the incorrectly identified images (e.g., the images with a value of "0" for the detected object). Assume, for example, that the detector block 30 determines that 50 images had the object that was correctly identified and that 50 images had the object that was incorrectly identified. In this case, the filter 32 separates the 50 correctly identified images from the 50 incorrectly identified images. FIG. 8 illustrates a plurality of filtered captured images from any images that have been incorrectly identified. As noted above, the apparatus 10 generates and applies the bounding box 35 over each image prior to determining whether the object is correctly or incorrectly identified.

Figure 9:
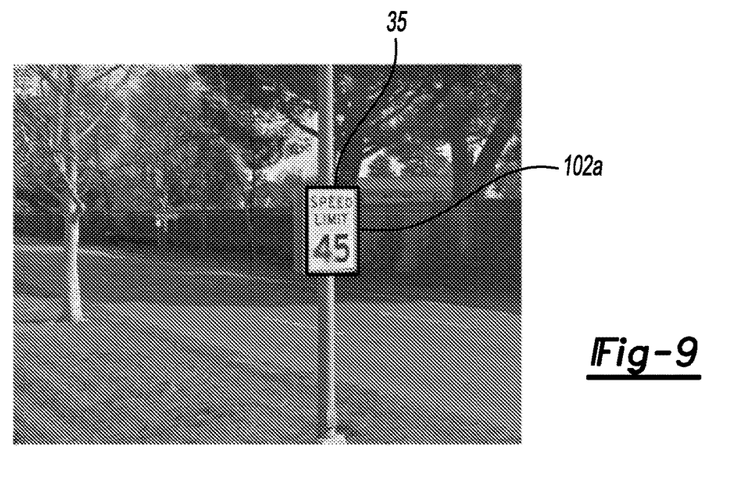
FIG. 9 depicts an image of an extracted objected from the bounding box in accordance to one embodiment.

In operation 88, the extraction block 34 extracts the object from within the bounding box 35. As shown in FIG. 9, the bounding box 35 placed around the object for the correctly identified image 102*a*. FIG. 9 illustrates the presence of the bounding box 35 around the correctly identified image 102*a*. However, it is recognized that the bounding box 35 may also be placed around the correctly identified image 102*b* of FIG. 8.

Figure 10:
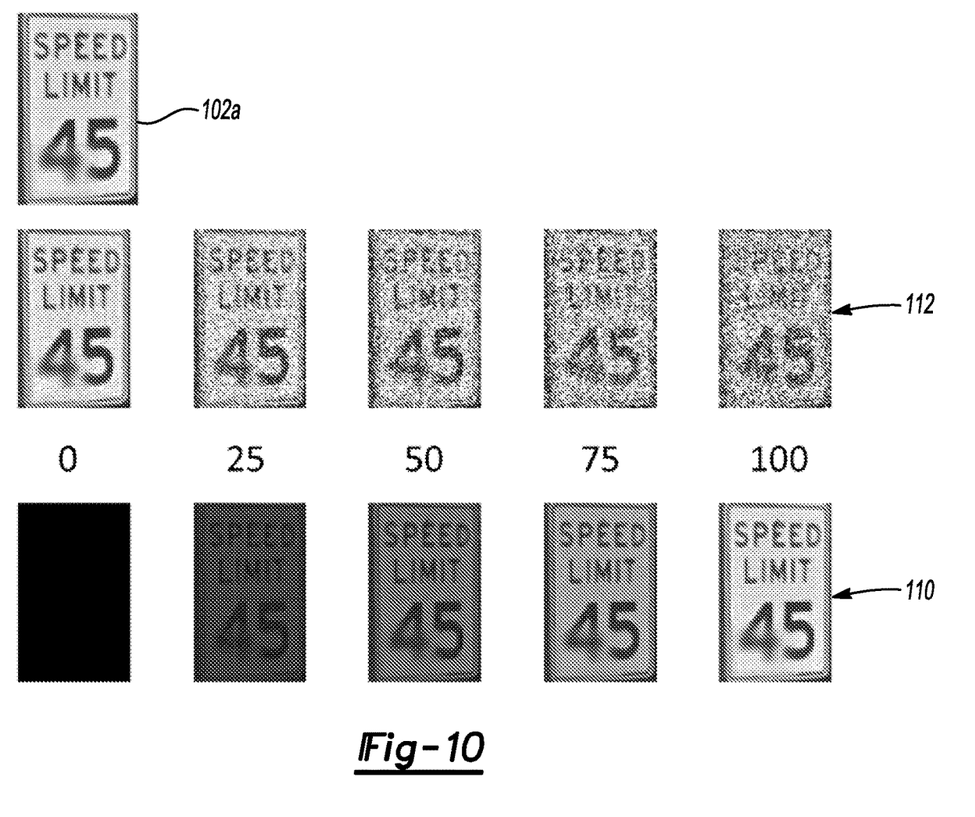
FIG. 10 depicts a plurality of generated gradient images in accordance to one embodiment.

In operation 90, the gradient generator 36 applies any number of special effects or gradients (e.g., saturation, distortion, contrast, blurriness, sharpness, etc.) at different levels (e.g., 0 to 100) to the extracted object of the correctly identified images to generate a plurality of gradient images. The plurality of gradient images are images with a single image parameter (or single gradients) which may be for example brightness. FIG. 10 illustrates corresponding gradient levels (e.g., 0, 25, 50, 75, 100) that are applied to the correctly identified image 102*a* for contrast (see generally 110) with a corresponding Gaussian Noise (see generally at 112). As generally shown at 112, the corresponding Gaussian noise for each contrast level (e.g., 0, 25, 50, 75, and 100) that is applied to the image 102*a*. Generally, if an image parameter transformation may be defined as a scalable modification to one of the image's many parameters (or gradients) (e.g., brightness, contrast, etc.), then the Gaussian Noise is considered an image parameter transformation which may be, for example, similar to changing the brightness.

Figure 11:
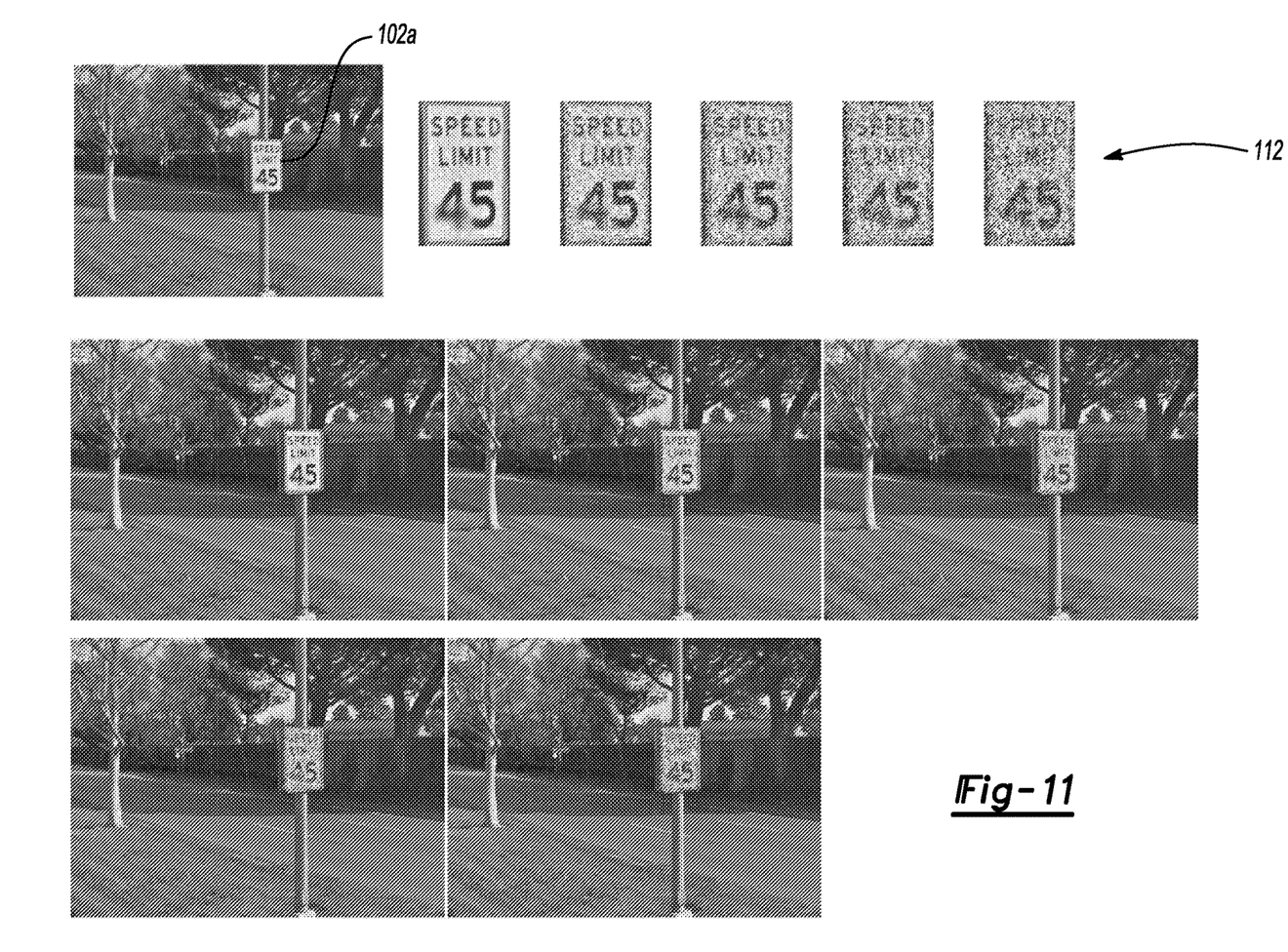
FIG. 11 depicts a synthesized composite for each generated gradient image in accordance to one embodiment.

In operation 92, the synthesizer block 38 composites the plurality of gradient images back to the original set of correctly identified images. For the example, the synthesizer block 38 composites the plurality of gradient images back to the original set of correctly identified images that were generated by the filter 32. Each of the 100 gradient images is placed as an overlay layer on top of the original base image in the bounding box coordinates (e.g., gradient value 0+base image=composite image 0, gradient value 1+base image=composite image 1, etc.) The synthesizer block 38 then flattens the image to create a base image with a single gradient object. FIG. 11 depicts a synthesized composite for each generated gradient image for the image 102*a*. The synthesizer block 38 inserts each new image parameter progression image into the originally captured image at the bounding box coordinates and flattens every image layer to provide a composite image. In addition, the apparatus 10 performs a resizing operation that is based on an original "base" image. This may be performed in operation 92. Each base image has its own bounding box coordinates and the extracted bounding box images can have different proportions (e.g., W×H) and before compositing. These different proportions are resized to fit the bounding box dimensions. In general, the composite images will not have bounding boxes injected into the image. As the new composites are generated, there should not be any assistance for the method 90 to locate the object (e.g., on in this case the sign).

In operation 94, the evaluation block 40 compares the object (e.g., with the applied gradient level) in each composite image to previously stored information corresponding to the object to determine whether the contents of the gradient image can be correctly identified (e.g., determines whether the speed limit sign with a corresponding gradient can be correctly identified). As noted above, the evaluation block 40 may assign a value of "1" for each image in which the object with the applied gradient level has been correctly identified out of the entire set of composite images. The evaluation block 40 may assign a value of "0" for each image in the object with the applied gradient level not been correctly identified out of the entire set of composite images. The evaluation block 40 records the particular gradient levels (e.g., saturation, distortion, contrast, blurriness, sharpness, etc.) as applied by the gradient generator 36 for the images that have been correctly identified and for the images that have not been correctly identified.

In operation 96, the analyzer block 42 determines a failure rate for the corresponding camera 20 by determining which of the particular gradient images have been incorrectly identified by the evaluation block 40. As noted above, the analyzer block 42 receives information corresponding to the particular gradient levels that correspond to an incorrectly identified gradient image and provides the failure rate (or a failure rate range for a camera 20). Again, consider for example, that the gradient of interest was a contrast level for a particular camera 20 and that the analyzer block 42 determines that the failure rate for the camera was at a contrast level of 56 or less (from a level of 0-100) and at a contrast level of 87 or higher. The analyzer block 42 may then determine that any images captured by the camera 20 having a contrast level of 56 or less and 87 or higher, will not be correctly identified by the camera 20. The analyzer block 42 may also determine that any images with a contrast level between 57 and 86 may be correctly identifying for the camera 20 of interest. Alternatively, the analyzer block 42 may receive information corresponding to the particular gradient levels that correspond to a correctly identified gradient image and provides the success rate (or a success rate range for a camera 20) for a particular camera 20. The analyzer block 42 may determine the failure rate range for a particular gradient of interest after determining the success rate range. The analyzer block 42 may then provide the failure rate information and/or success rate information for the contrast level to the user interface 18 to provide such information to a user. Therefore, any system level engineer can associate a corresponding contrast level for a particular camera and essentially understand the camera's performance characteristics (i.e., failure or success rate in correctly identifying an image at a particular gradient of interest).

In operation 98, the user interface 18 provides the failure rate information and/or success rate information for the contrast level (or for the gradient of interest) to the user interface 18 to provide such information to a user.

Generally speaking, it may be advantageous to proceed with the correctly identified images because object detection can be classically defined as the detection of a valid object within the image. Real world images may not contain valid objects. Correctly removing or cleaning an image requires a priori knowledge of how the object is not valid with respect to the algorithm that is executed via hardware which may not be available. It may be easy to add or inject data into the image. Therefore, it may be simple to inject data into the image to gradually transform a valid object into an invalid object. Finally, it may be advantageous to determine a threshold of degrading performance for the camera 20 as the image transitions from a passing threshold to a failing threshold.

Figure 12:
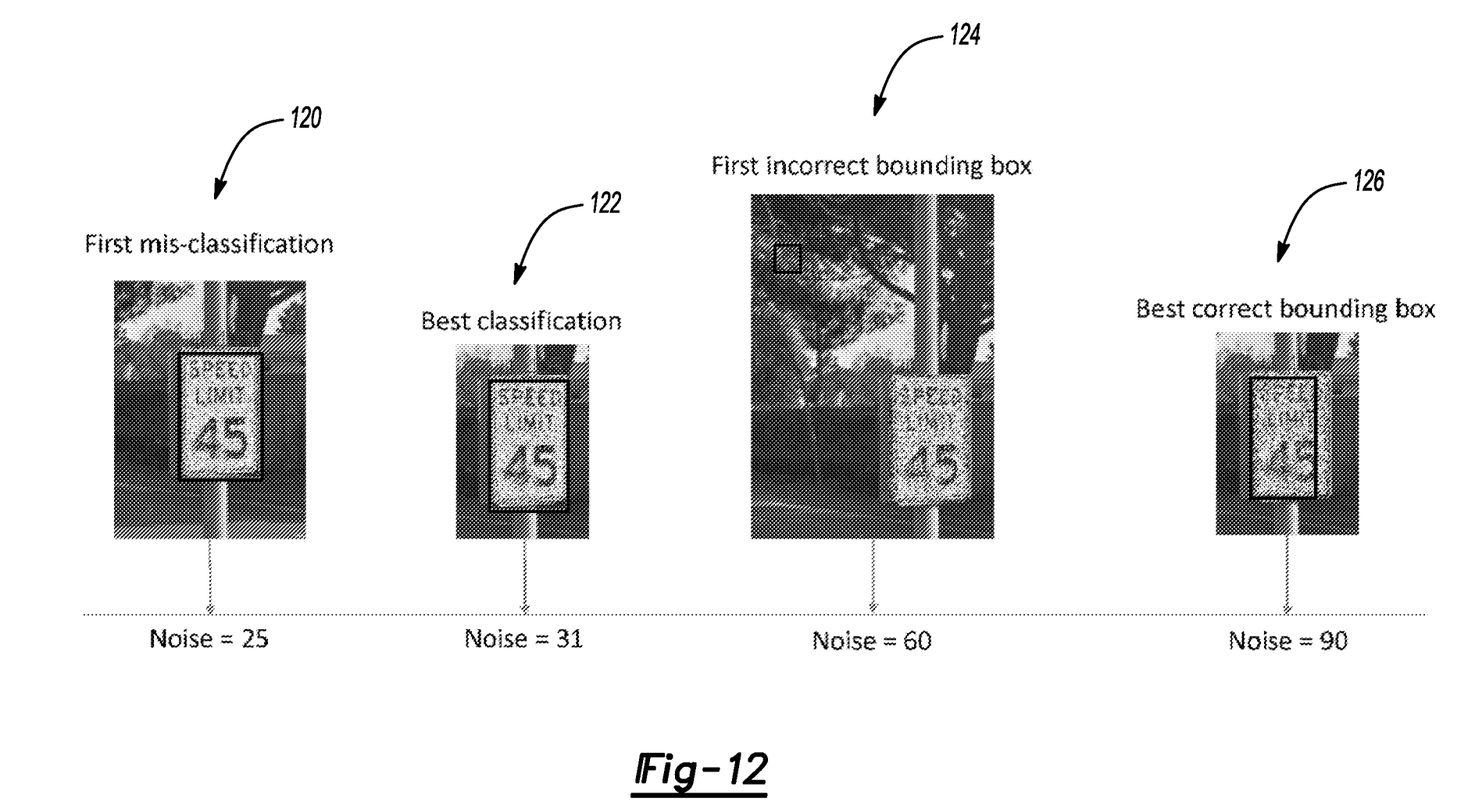
FIG. 12 depicts a new set of gradient images against original images in accordance to one embodiment.

FIG. 12 generally depicts a new set of gradient images against original images and various classifications as identified based on the image parameter transformation (IPT) values. Assume for example that across all IPTs, "0" corresponds to an original image and "100" corresponds to a "full parameter transformation." Such a designation as now defined illustrates that the darkest image as generally shown at 110 (see image farthest to the left) to be 100 and the unmodified image as 0 (see image farthest to the right).

For completeness, a misclassification corresponds to an estimated incorrect type of the object (e.g., the speed limit of the sign is 40 mph vs 45 mph) as determined by the method 80 and an incorrect bounding box indicates that the method 80 determined the sign (or object) was in a different location in the image.

Element 120 generally indicates a lowest IPT value for a misclassification which generally corresponds to a smallest value of the image parameter transformation that caused a misclassification. Thus, with element 120, the IPT value was 25 and all other misclassifications occurred at higher IPT values (these are not shown in FIG. 12).

Element 122 generally indicates a highest IPT value having correct classification irrespective of any other misclassifications. In this case, the highest value of image parameter transformation is 31 that was correctly classified. All other correct classifications occurred at lower IPT values (these are not shown in FIG. 12).

Element 124 generally indicates a lowest IPT value for an incorrect bounding box within a specified tolerance of coordinate error. For example, element 124 corresponds to the smallest value of the IPT that caused the method 80 to incorrectly detect a sign (or the object) somewhere else in the image. In this case, the lowest IPT value for an incorrect bounding box is 60 and all other incorrect bounding boxes occurred at higher IPT values (these are not shown in FIG. 12).

Element 126 generally indicates a highest IPT value for a correct bounding box within a specified tolerance of coordinate error and regardless of any other incorrect bounding boxes. For example, element 126 corresponds to the highest value of the IPT that caused the method 80 to correctly detect the sign in the image. In this case, the highest IPT value is 90 and all other correct bounding boxes occurred at lower IPT values.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer readable medium storing a computer-program product that is programmed to detect a performance threshold for one or more cameras, the computer-program product comprising instructions to:
    capture a plurality of images from one or more cameras;
    compare an object within each captured image to a predetermined object to determine whether the object has been correctly identified;
    extract the object from each captured image that is determined to be correctly identified;
    apply at least one gradient to each extracted object to generate a plurality of gradient images, wherein each gradient image includes the extracted object that is modified by the at least one gradient;
    compare the extracted object that is modified by the at least one gradient to the predetermined object;
    determine whether the extracted object that is modified by the at least one gradient has been correctly identified based on the comparison of the extracted object that is modified by the at least one gradient to the predetermined object; and
    establish a performance threshold for the one or more cameras after determining whether the extracted object that is modified by the at least one gradient has been correctly identified.

2. The non-transitory computer readable medium of claim 1, wherein the instructions to establish the performance threshold for the one or more cameras further comprise instructions to establish the performance threshold for a performance gradient for the one or more cameras after determining whether the extracted object that is modified by the at least one gradient has been correctly identified.

3. The non-transitory computer readable medium of claim 2, wherein the performance gradient includes one of saturation, distortion, contrast, blurriness, sharpness, and brightness.

4. The non-transitory computer readable medium of claim 1 further comprising instructions to filter each object from each captured image that is determined to be correctly identified prior to extracting the object from each captured image.

5. The non-transitory computer readable medium of claim 4 further comprising instructions to apply a bounding box around each object from each captured image prior to filtering the object from each captured image that is determined to be correctly identified.

6. The non-transitory computer readable medium of claim 5 further comprising instructions to extract the object prior to applying the at least one gradient.

7. The non-transitory computer readable medium of claim 1 further comprising instructions to receive the at least one gradient via a user interface.

8. The non-transitory computer readable medium of claim 1 further comprising instructions to display the performance threshold via a user interface for the one or more cameras.

9. An apparatus to detect a performance threshold for one or more cameras, the apparatus comprising:
    a memory device; and
    an image detector including the memory device and being configured to:
        capture a plurality of images from one or more cameras;
        compare an object within each captured image to a predetermined object that is stored on the memory device to determine whether the object has been correctly identified;
        extract the object from each captured image that is determined to be correctly identified;
        apply at least one gradient to each extracted object to generate a plurality of gradient images, wherein each gradient image includes the extracted object that is modified by the at least one gradient;
        compare the extracted object that is modified by the at least one gradient to the predetermined object;
        determine whether the extracted object that is modified by the at least one gradient has been correctly identified based on the comparison of the extracted object that is modified by the at least one gradient to the predetermined object; and establish a performance threshold for the one or more cameras after determining whether the extracted object that is modified by the at least one gradient has been correctly identified.

10. The apparatus of claim 9, wherein the image detector is configured to establish the performance threshold for a performance gradient for the one or more cameras after determining whether the extracted object that is modified by the at least one gradient has been correctly identified.

11. The apparatus of claim 10, wherein the performance gradient includes one of saturation, distortion, contrast, blurriness, sharpness, and brightness.

12. The apparatus of claim 9, wherein the image detector is further configured to filter each object from each captured image that is determined to be correctly identified prior to extracting the image from each captured image.

13. The apparatus of claim 12, wherein the image detector is further configured to apply a bounding box around each object from each captured image prior to extracting the object from each captured image.

14. The apparatus of claim 13 wherein the image detector is further configured to extract the object prior to applying the at least one gradient.

15. The apparatus of claim 9 wherein the image detector is configured to receive the at least one gradient via a user interface.

16. The apparatus of claim 9 wherein the image detector is further configured to display the performance threshold via a user interface for the one or more cameras.

17. An apparatus to detect a performance threshold for one or more cameras, the apparatus comprising:

a memory device; and an image detector including the memory device and being configured to:

capture a plurality of images from one or more cameras in a vehicle;

compare an object within each captured image to a predetermined object stored on the memory device to determine whether the object has been correctly identified;

extract the object from each captured image that is determined to be correctly identified;

apply at least one gradient to each extracted object to generate a plurality of gradient images, wherein each gradient image includes the extracted object that is modified by the at least one gradient;

compare the extracted object that is modified by the at least one gradient to the predetermined object;

determine whether the extracted object that is modified by the at least one gradient has been correctly identified based on the comparison of the extracted object that is modified by the at least one gradient to the predetermined object; and establish a performance threshold for the one or more cameras after determining whether the extracted object that is modified by the at least one gradient has been correctly identified.

18. The apparatus of claim 17, wherein the image detector is further configured to establish the performance threshold for a performance gradient for the one or more cameras after determining whether the extracted object that is modified by the at least one gradient has been correctly identified.

* * * * *